Jan. 1, 1963  C. F. WOLFENDALE  3,071,758
POTENTIOMETERS

Filed Sept. 29, 1959  5 Sheets-Sheet 1

INVENTOR
CALEB FREDERICK WOLFENDALE

BY Hane and Nydick
ATTORNEYS.

Jan. 1, 1963  C. F. WOLFENDALE  3,071,758
POTENTIOMETERS
Filed Sept. 29, 1959  5 Sheets-Sheet 2

INVENTOR
CALEB FREDERICK WOLFENDALE
BY
ATTORNEYS

INVENTOR
CALEB FREDERICK WOLFENDALE
BY Hanna and Nydick
ATTORNEYS

United States Patent Office 3,071,758
Patented Jan. 1, 1963

3,071,758
POTENTIOMETERS
Caleb Frederick Wolfendale, Ealing, London, England, assignor to Servomatic Hydraulics (Guildford) Limited, a British company
Filed Sept. 29, 1959, Ser. No. 844,605
7 Claims. (Cl. 340—187)

The invention relates to potentiometers, and is more particularly, but not exclusively, concerned with an improved form of potentiometer for use in determining the position of a member along a track or for positioning a member along a track.

The invention provides, in one of its aspects, a potentiometer comprising a series of separate and discrete electrically conductive elements arranged in adjacent side-by-side relation so as to form a line of elements, a pick-up electrode adjacent to said elements but spaced therefrom, and means for producing relative movement between said elements and said pick-up electrode, so that when mutually different electrical potentials are applied to said elements, said pick-up electrode assumes a potential dependent on its position relative to said line of elements.

The invention provides, in another of its aspects, apparatus for indicating the position of a movable member along a track, which comprises a series of separate and discrete electrically conductive elements arranged in adjacent side-by-side relation so as to form a line of elements which simulates the track along which said movable member can move, a pick-up electrode adjacent to said elements but spaced therefrom and so connected to said movable member that when the latter moves along said track said pick-up electrode makes a corresponding movement along said line of elements, so that when mutually different electrical potentials are applied to said elements, said pick-up electrode assumes a potential dependent on its position along the length of said line of elements and hence on the position of said movable member along said track a source of a reference potential, a comparator to which said reference potential and a potential detained from said pick-up electrode are applied, which comparator gives an output indicative of the position of said movable member with respect to a datum position to which said reference potential corresponds, and an indicator under control of said comparator which indicates the position of said movable member.

The invention provides, in yet another of its aspects apparatus for positioning a movable member along a track, which comprises a series of separate and discrete electrically conductive elements arranged in adjacent side-by-side relation so as to form a line of elements which simulates the track along which said movable element can move, a pick-up electrode adjacent to said elements but spaced therefrom and so connected to said movable member that when the latter moves along said track said pick-up electrode makes a corresponding movement along said line of elements so that when mutually different electrical potentials are applied to said elements, said pick-up electrode assumes a potential dependent on its position along the length of said line of elements and hence on the position of said movable member along said track, a source of a reference potential, a comparator to which said reference potential and a potential obtained from said pick-up electrode are applied which comparator gives an output indicative of the position of said movable member with respect to a datum position to which said reference potential corresponds, and positioning means which, in response to the application of said comparator output thereto, moves said movable member to said datum position.

The invention will now be described with reference to the drawings, in which.

Each of the capacitive potentiometers described herein has a linear array of electrodes which are insulated from each other, and to which successively greater A.C. potentials are applied. As a pick-up electrode moves along the linear array, its potential indicates its position along that array. If the pick-up electrode is moved in conjunction with a machine element such as the milling head referred to above, the potential thereof indicates the position of that machine element.

This potential is compared with a reference potential so that an indication is given of the position of the machine element with respect to a datum position.

Figure 1:
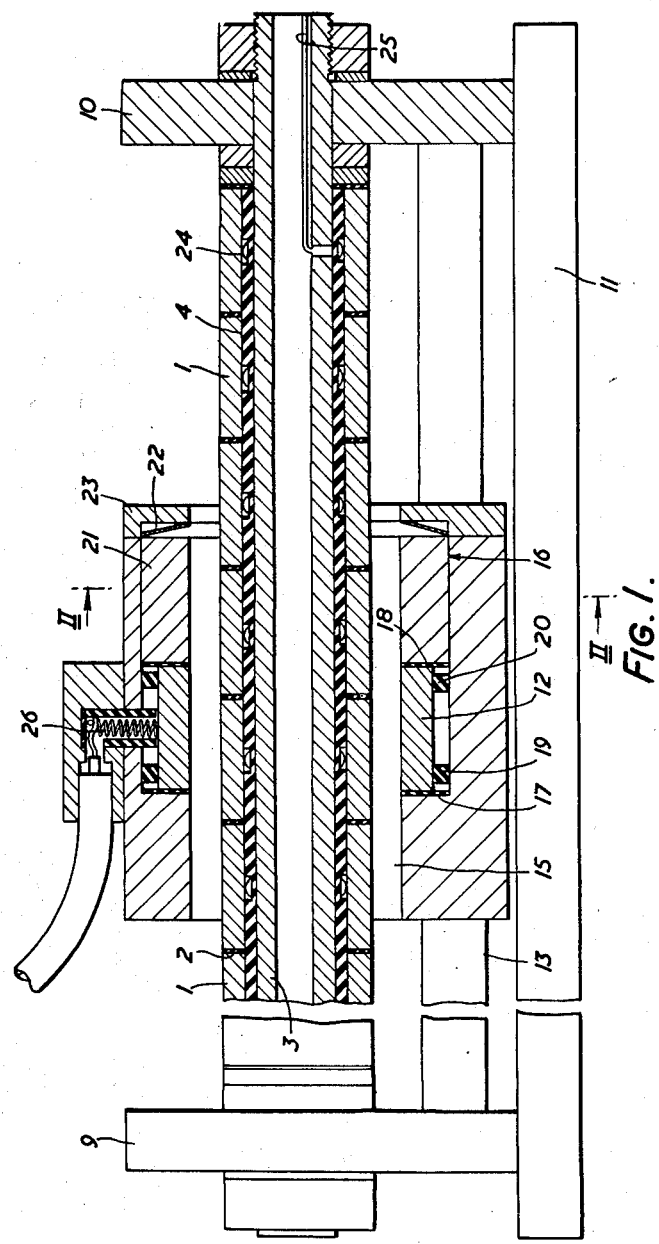
FIGURE 1 is a side elevation, partly sectionalised of a potentiometer which is used for accurately positioning the milling head of a milling machine relative to the table.
Figure 2:
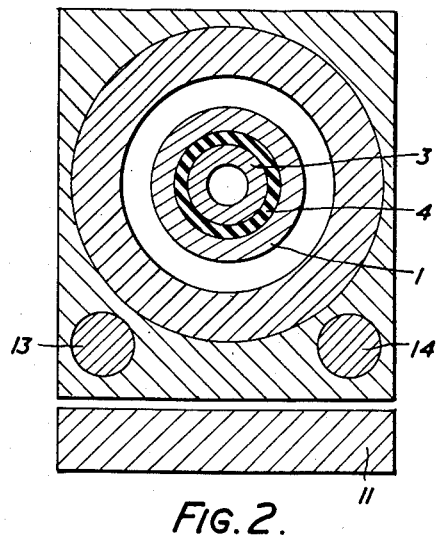
FIGURE 2 is a cross section along the lines II—II of FIGURE 1.

In FIGURES 1 and 2, the elements of the capacitive potentiometers are similar and each cylindrical or ring shaped. Thirteen elements such as 1 are threaded alternately with thin insulating washers such as 2 of the same external diameter onto a straight tube 3 having a coating 4 of insulating material. This assembly is clamped between two nuts threaded onto the shaft and spaced from its ends by insulating spacer rings or washers. The clamped assembly is mounted between two end plates 9 and 10 upstanding from a rigid base plate 11 and is secured in position by two further washers and nuts, one at each end, engaging against the outer faces of the end plates. The electrical assembly has a smooth continuous cylindrical outer surface consisting of discrete equally-spaced electrically conducting elements whose boundaries lie in planes at right angles to the axis of the shaft.

A carriage for the pick-up electrode 12 is slidably mounted on two circular section rigid rods 13, 14 extending between end plates 9 and 10 below the level of the shaft 3 and on opposite sides thereof, so that the carriage is constrained to move precisely parallel to the axis of the assembly. The carriage is of rectangular external shape and has a horizontal bore through it which is stepped intermediate its length to increase its diameter for about two thirds of its length. The narrower portion 15 of the bore has a diameter of about one third greater than the external diameter of the electrical assembly.

The pick-up electrode 12 is a thick walled cylinder whose axial length is about one third of that of the carriage, an internal radius equal to that of the narrower portion 15 of the bore, and an external radius slightly less than the internal diameter of the larger diameter portion 16 of the bore. It is mounted in the carriage between thin insulating washers 17, 18 of similar thickness and is encircled by insulating rings 19, 20 the external diameters of which are such that they are a good fit in the larger diameter portion of the bore. The pick-up electrode 12 is retained in position by a retaining cylinder 21 which extends from the electrode 12 to the end face of the carriage, and is itself retained in position by a spring washer 22 against an end cap 23. The end faces of the pick-up electrode 12 are perpendicular to the axis of the assembly, and the inner surfaces of the narrower portion 15 of the bore, the pick-up electrode 12 the retaining cylinder 21, and of the insulating washers 17 and 18 all lie on a common cylindrical surface. When the apparatus is in use, the carriage is earthed, so that the housing and the retaining cylinder 21 provide guard rings for the pick-up electrode to avoid inaccuracies due to unwanted influences.

Figure 3A:
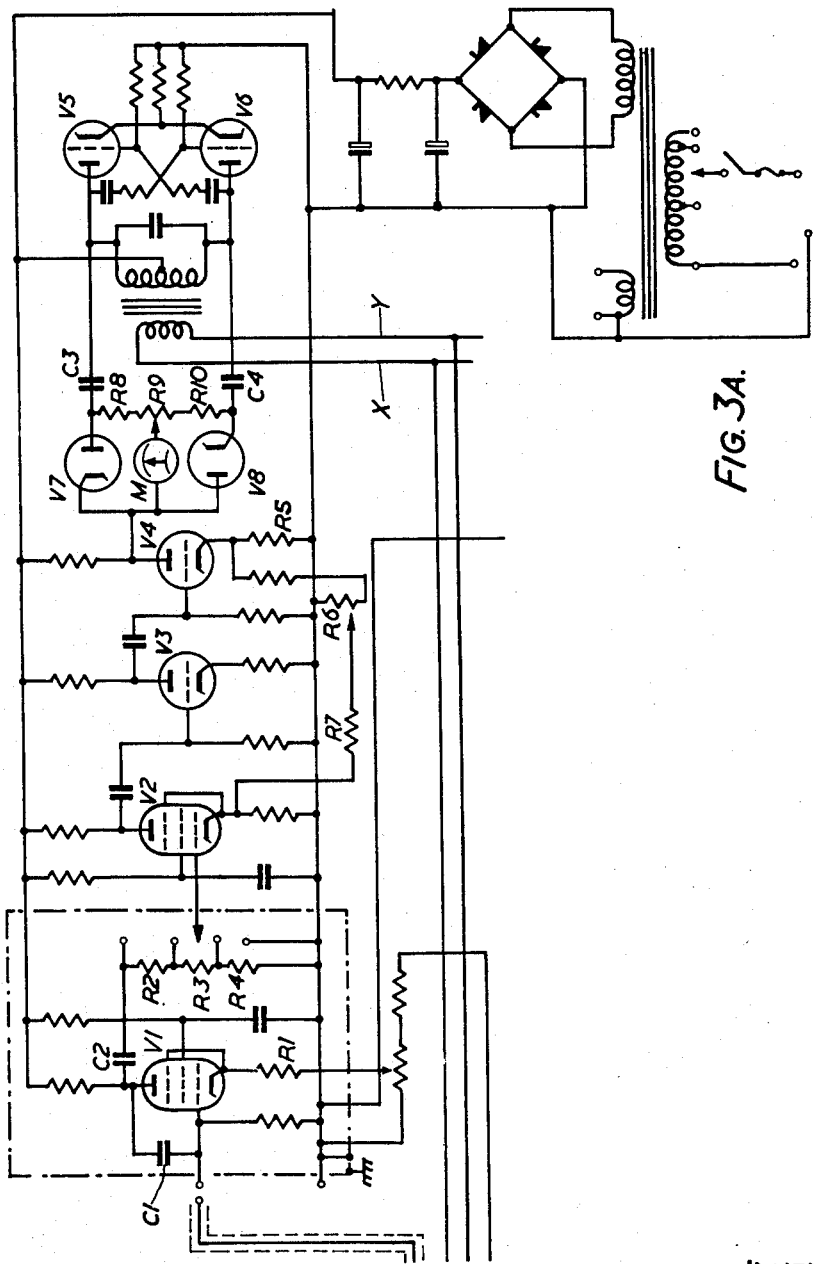
FIGURE 3 shows the circuit used in conjunction with the potentiometer shown in FIGURES 1 and 2.
Figure 3B:
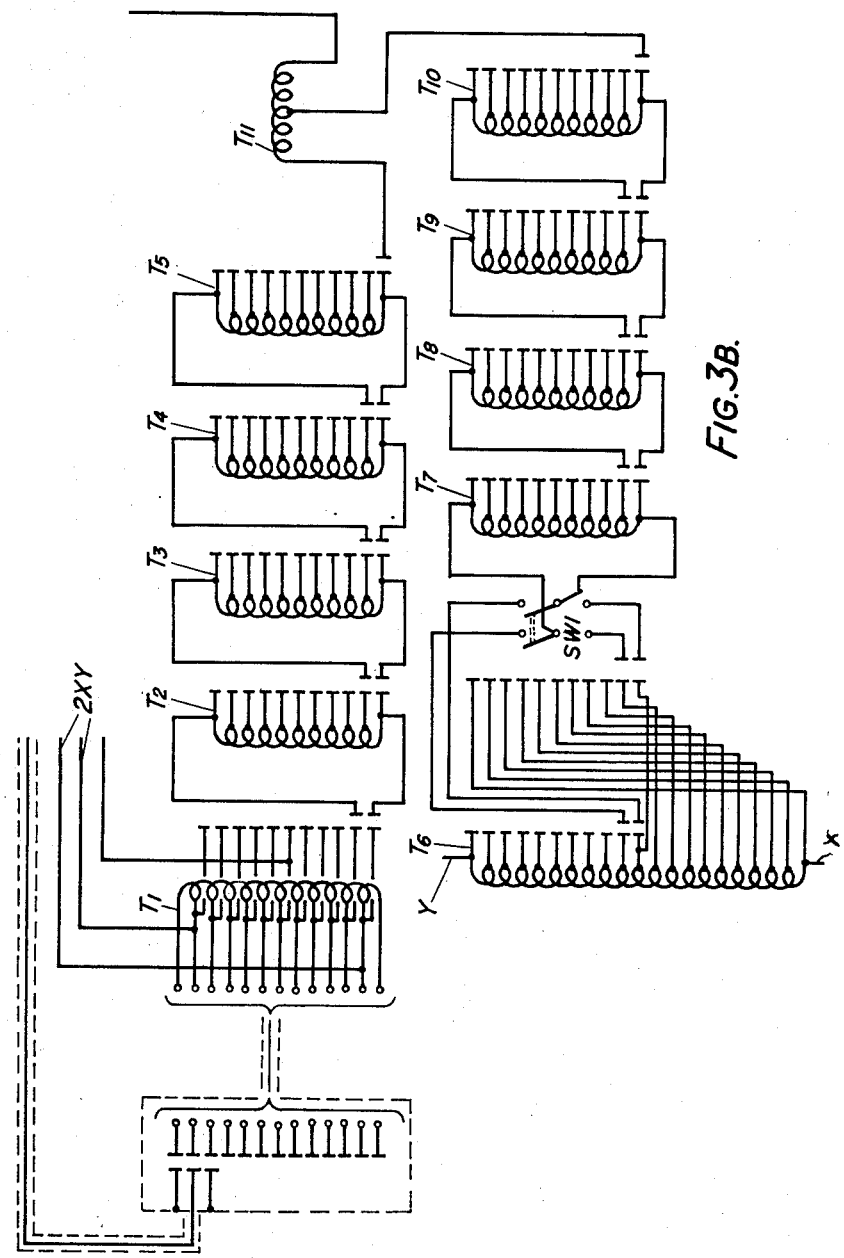

Referring now to FIGURE 3, the ring-elements 1 are energised from a toroidal auto-transformer T1 energised from reference supply X—Y and which has thirteen tappings which are sequentially connected to the ring elements 1 so that there is a uniformly progressive increase in potential of the elements along the assembly. The connections to the ring elements are made by means of spring contacts such as 24 (FIGURE 1) inside the electrical assembly and leads indicated at 25, FIGURE 1, which extend through shaft 3. Electrical connection to the pick-up electrode 12, FIGURE 1, is similarly made by means of a spring contact 26 on the housing.

With equal increments of potential applied to the elements, a graph of the potential of the electrode against its linear position is not, in general, exactly linear due to manufacturing inaccuracies. However, an axial length of the pick-up electrode can be found for which this graph is substantially linear. This length substantially equals to the pitch of the elements but its exact value depends on numerous factors, e.g. the thickness of the insulating washers and the length of the guard rings, and may be referred to as the "effective electrical length" of the pick-up electrode. In practice this length would be determined empirically.

The signal from the pick-up electrode is fed to the grid of a pentode V1 by a screened cable. There is negative feedback from the anode V1 to its grid through a capacitor C1 so that any variation in the capacity of the screened cable to its surroundings produces negligible change in the signal from the pick-up electrode 12 and hence in the output from V1. V1 compares the pick-up electrode signal with a reference signal derived from a potential divider (T1—T2—T3—T4—T5) across the supply X—Y. The signal from the anode of V1 is thus dependent on the relative magnitudes of the signal from the pick-up electrode and the reference signal.

It will be noted that the transformer T1, from which the energising potentials for the ring elements are obtained, also forms part of the potential divider which supplies the reference potential. This is convenient in the present case, but is not always convenient if the ring elements are not an exact pitch, when it is preferable to use a potential divider wholly separate from the transformer which supplies the reference potential.

The amplified signal from the anode of V1 is fed through capacitor C2 to one terminal of a potentiometer R2—3—4 whose other terminal is earthed. R2—3—4 introduces a precise attenuation in the signal and an attenuated signal is taken from its tap and fed to a three stage amplifier whose first stage is a pentode V2, the other two stages being triodes V3 and V4. The attenuated signal from R2—3—4 is fed to the grid of V2. There is negative feedback from the cathode of V4 to the cathode of V2 through a resistor R5, a potentiometer R6 and a second resistor R7 to stabilise the gain of the amplifier.

The H.T. potential is taken from a full-wave rectifier power pack. The reference supply is derived from a push-pull oscillator comprising two triodes V5 and V6, whose anodes are connected together by a parallel tuned circuit, a centre tap on the inductor being connected to H.T. positive. Oscillations generated in the tuned circuit are transferred to a secondary winding coupled to the inductor, and connected to the second and twelfth tapping of the auto-transformer T1.

The output from the amplifier V2—V3—V4 forms the input of a phase-sensitive detector which comprises diodes V7 and V8. The anode of V7 is connected to the anode of V5 through a small capacitor C3 and the cathode of V8 is connected to the anode of V6 through a similar capacitor C4. The anode of V7 is connected to the cathode of the V8 through a series circuit comprising resistor R8, potentiometer R9 and resistor R10. An A.C. centre zero meter M is connected between the tap of R9 and the junction between V7 and V8, and the amplifier output is fed into the detector at this point. During one half cycle, V7 and V8 both conduct and during this half cycle no current flows through the meter M. During the other half cycle, V7 and V8 do not conduct, and current flows through the meter M in a direction depending on the relative phase between the input signal or voltage and the voltage obtained from the tuned circuit, i.e. the reference voltage. The detector thus works as a half-wave gate.

The potential divider which supplies the reference voltage for the cathode of V1 comprises five auto-transformers T1, T2, T3, T4, T5, each having ten closely-coupled identical windings and eleven taps. The end taps of T2 are connected to two contacts which can make electrical contact with any two consecutive taps of T1, so that any selected tenth of the voltage generated by the oscillator can be applied to T2. The remaining three transformers are similarly connected together in cascade, so that the potential across T1 can be divided in 100,000 parts and the selected potential taken from a single tap on the fifth transformer.

This potential can itself constitute the reference potential, in which case movement of the pick-up electrode can only be measured from a starting position in one direction. To avoid this, a second or incremental potential divider, is connected across the supply X–Y. This comprises a first, closely coupled auto-transformer T6 having twenty-one taps. The centre tap and the ten taps on one side are connected to eleven studs with which a pair of contacts co-operate so that the potential between any two consecutive studs can be selected and fed to two of the terminals of a double pole change-over switch S.W.1. Similarly the centre tap and the other ten taps are connected to eleven further studs with which a second pair of contacts connected to the other two terminals of S.W.1. co-operate in a similar way. Thus, negative and positive increments of the voltage across T6 can be selected by altering S.W.1. and adjusting the setting of the appropriate pair of contacts.

The movable contacts of S.W.1. are connected to the end taps of a closely coupled auto-transformer T7 having eleven taps, which is followed by three further similar auto-transformers T8, T9, T10 in cascade. Thus, each half of the potential across the first transformer of the second potential divider can be divided into 100,000 parts and the incremental potential taken from a single tap on T10.

The potentials selected from the two potential dividers, T2—T5 and T7—T10 are added by a centre-tapped auto-transformer T11, one terminal of which is connected to the output from T5 and the centre tap of which is connected to the output from T10. Thus, a voltage appears at the other terminal of T11 which is the algebraic sum of the potential selected from the main potential divider and twice the potential selected from the incremental potential divider.

It is desirable for many reasons to obtain a position of balance of the apparatus in which the reference potential is "earth" and hence the other terminal of T11 is connected to earth and to the cathode of V1.

It is not generally possible to produce an arrangement as described above in which exact linearity between the position and the potential of the pick-up electrode is obtained. In fact, there is usually a discrepancy between the assigned "electrical length" of the dividing network, that is the range of potentials which can be selected as reference potentials by means of the potential dividers, and the mechanical length of the potentiometer assembly as indicated by the range of potentials of the pick-up electrode as it transverses the potentiometer. However, the mechanical length of the potentiometer is not easily adjustable and consequently correction is applied to the dividing network.

As discussed above the potentiometer can be adjusted so that a graph of the potential of the pick-up electrode against its linear position along the electrical assembly, is a straight line. This line intersects the linear-position-axis mid-way in the travel of the pick-up electrode. Thus, when the pick-up electrode is in its mid-position, there will be no potential difference between the pick-up electrode and the central tap of the T1. However, as the electrode is moved away from the mid-position there will be a difference between the two potentials which is dependent on the displacement of the pick-up electrode.

This change in potential difference provides a relatively simple method of correcting for any discrepancy between the effective "electrical length" of the dividing network and the mechanical length of the potentiometer since a correction signal can be taken from the centre tap of the T1 and added to or subtracted from the signal or potential of the pick-up electrode. This changes the slope of the output graph and consequently alters the rate of change of potential of the pick-up electrode as it moves along the potentiometer.

If the mechanical length of the potentiometer is greater than the effective electrical length of the dividing network, the feedback from the centre tap of T1 can be added to or subtracted from the pick-up electrode signal by:

(a) Connecting a resistor in series with a potentiometer between the centre tap and the earth line, and connecting the tap of that potentiometer to R1, as shown in FIGURE 3.

(b) Connecting a reversing transformer in series with a small capacitor between the centre tap and the grid of V1.

(c) Applying the signal from the centre tap to a suitable point on R2—R3—R4 through a resistor whose resistance is high enough to prevent loading V1.

Where the mechanical length of the potentiometer is less than the effective electrical length of the dividing network, methods (a) and (c) would incorporate reversing transformers and the reversing transformer in (b) would be omitted.

In practice, the slope of the output graph is adjusted by repeated comparison of the actual displacement of the pick-up electrode as determined by a standard length bar, with the displacement indicated electrically, until the two coincide. The sensitivity of the meter is then adjusted to the required value by adjusting the setting of R5. This enables the meter to be calibrated directly in terms of displacement. If the full scale deflection of the meter corresponds to $10^{-4}$ inches displacement of the pick-up electrode, the deflection can usually be read to one percent permitting small displacements of the pick-up electrode to be measured.

As previously mentioned it is not generally possible to obtain a precisely uniform pitch between the potentiometer elements, which leads to non-linearity in the output graph. This may be partly corrected by superimposing an additional potential on any one or more of the elements to raise or lower the potentials thereof. This may be done by including in series with each of the leads to the elements a winding on an auxiliary transformer energised from the oscillator, which windings may be connected in series with the tappings on the toroidal transformer.

The effect of the two potential dividers and of the autotransformer T11, whose end is earthed, is that the potential of the centre-tap of T1 is varied with respect to earth by a value dependent on the settings of T2—T10. The cathode of V1 is connected to a point whose potential lies between these two values, so that adjustment of these potentiometer taps adjusts the reference potential. The position of the machine element is then adjusted until the meter needle is at the centre-point of the scale. The element is then correctly positioned. Should it move subsequent to that positioning, the needle of the meter M indicates the direction and the extent of the movement. If desired the position of the machine element can then be adjusted either manually or automatically to return it to the originally selected position. As an alternative, the output due to the difference between the reference potential and the pick-up electrode potential can be used, via a servo system to automatically re-position the machine element. As a slight modification of the latter arrangement, the difference output could be used to position an inspection device such as a travelling microscope.

A simplified construction for the capacitive potentiometer is one which dispenses with the parallel guide rods. In this, the pick-up electrode assembly, consisting of the pick-up electrode, flanked by its two guard rings is mounted in a cylindrical housing whose ends are closed by circular plates. These latter plates have at their centres holes which are threaded by the electrode assembly, with bushes of insulating material between the electrode assembly and the pick-up electrode housing. Since the electrode assembly is very hard, and is ground and lapped to a uniform diameter, it is very suited to supporting the pick-up and its guard rings and the above-mentioned bushes.

Figure 4:
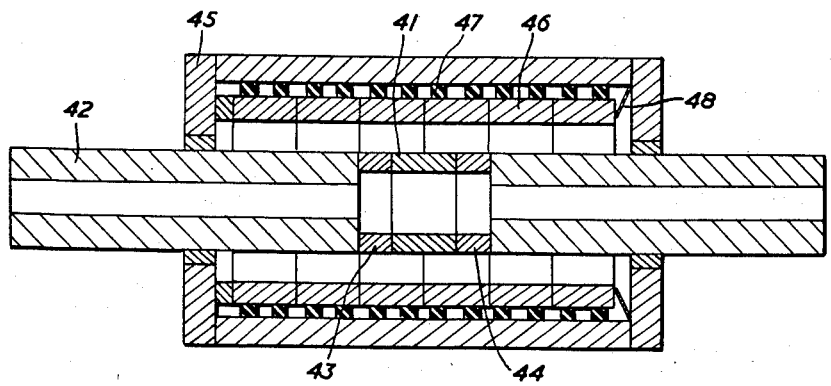
FIGURE 4 is a sectionalised view of an alternative form of capacitive potentiometer.

The capacitive potentiometer shown in sections in FIGURE 4, is, in effect, an inverted version of that shown in FIGURES 1 and 2, since it has a pick-up electrode 41 let into a shaft 42, which is connected to the machine element. Although they are not shown in FIGURE 4, guard ring electrodes 43, 44 are provided, one on each side of the pick-up electrode 41. This shaft moves within a body 45, the shaft being spaced within holes in the ends of the body. Inside the body there are six stator elements such as 46 which are insulated from each other and connected to successively greater A.C. potentials in a manner similar to that of the potentiometer shown in FIGURES 1 and 2. These are spaced from the inside of the body 45 by spacers such as 47, and are held in place by a spring washer 46.

A typical potentiometer unit 10" long has six identical cylinders each 2.5" long, with 0.005" of epoxy resin-bonded fibre glass at one end, and having an internal diameter of 1.25", and 3/16" wall thickness. Each has on its outside two rings of insulating material 3/32" thick, these forming the spacing 45. These are mounted inside the body 43, which is a cylinder 15" long. The shaft is 3/4" in diameter and has a centre section 2.5" long with 0.005" of insulation on 1¼" guard rings on each of its sides. A connection to the electrode 41 is taken by a coaxial cable down the centre of the shaft. Connections from the six stator cylinders are terminated on a socket fitted to the body 43.

Figure 5:
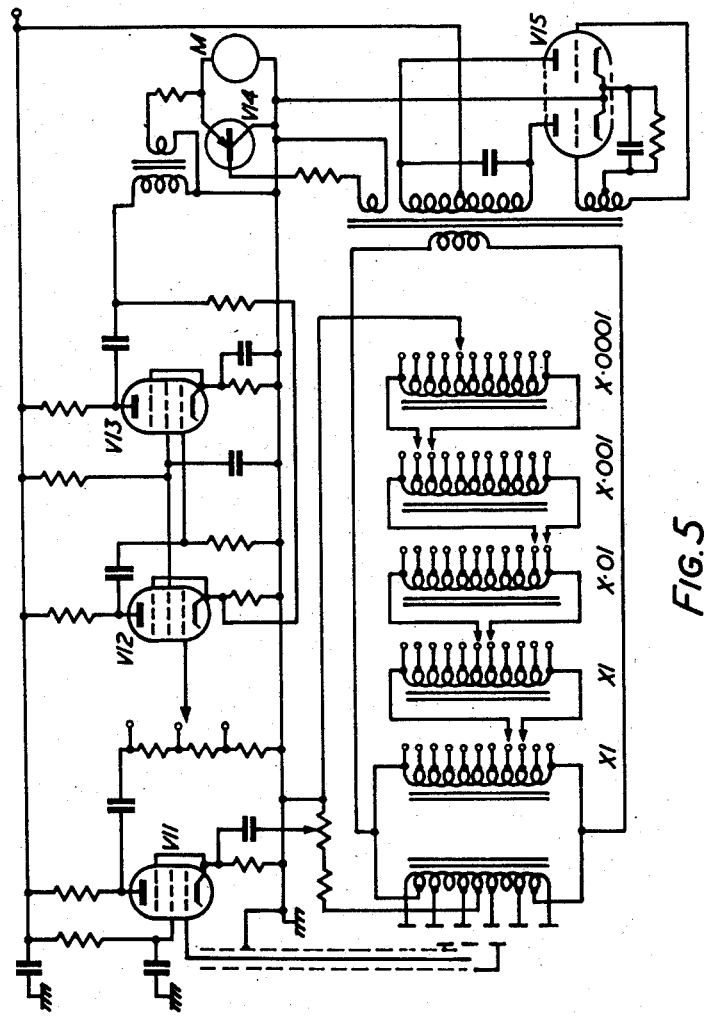
FIGURE 5 is the circuit used in conjunction with the potentiometer shown in FIGURE 4.

The circuit shown in FIGURE 5 is similar to, but somewhat simpler than that of FIGURE 3. The capacity between the pick-up electrode and the stator assembly is about 6 pf., and the capacity to earth including the coaxial cable is of the order of 100–200 pf. If the reference voltage is 20 volts at 3000 cycles, and unit error displacement is $10^{-5}$ inches, then unit error signal is about $20 \times 10^{-6}$ volts.

The cable is connected to the grid of a pentode V11 which feeds an amplifier V12—V13, having negative feedback so that it is a unity-gain amplifier. The null detector is a transistor half-wave chopper 14, which is switched by the reference signal from the oscillator V15. This chopper shunts a meter M on alternate half cycles, which gives a stable balance position.

The potential divider is a unit similar to T1—T5 of FIGURE 3.

The invention is not restricted to the details of the foregoing examples. For instance, electrical elements may be of shape other than cylindrical, for example, they may be flat pieces of metal or a conducting layer deposited on some stable base material such as glass or quartz. Where the elements are flat the pick-up electrode would usually also be flat. The elements may be arranged to form a line of any shape e.g. flat elements may be arranged to lie around a circular line thereby permitting a member to be positioned in a circular track. The potentiometer may comprise only two elements which are scanned by a pick-up electrode.

Another possibility is for the circuits used to be fully transistorised, instead of using vacuum tubes. This gives the advantages that weight and volume are reduced, as is the susceptibility of the equipment to shock.

Another possibility which introduces some simplification is for the comparator to be a simple transformer. In this case the primary winding of the comparator transformer is connected between the pick-up electrode of the potentiometer and the output tap of the potential divider. Both the potentiometer and the potential divider are supplied a their ends with alternating current. The difference output is obtained from the secondary winding of the above-mentioned transformer. Thus this arrangement is an A.C. bridge with the primary of a transformer across its diagonal, the output from the secondary feeding the amplifier and indicating equipment. At this point it should be noted that the circuits using the capacitive potentiometer are, in effect, also A.C. bridges.

Finally, if the potentiometer is used for monitoring the position of an element capable of being positioned along a great length, e.g. 100 inches, it would be possible for the elements of the potentiometer on one side of the desired setting, other than those near that setting to be all connected to one potential, with a similar arrangement on the other side. This could mean that a higher degree of accuracy could be attained for a relatively long potentiometer than would be possible if all elements were connected to different potentials. In this case the nature of the difference potential when the pick-up is remote from the intended setting would indicate the direction in which it should be moved to regain that setting.

I claim:

1. An electrical capacitive potentiometer comprising at least three separate and discrete substantially cylindrical electrically conductive elements arranged in adjacent end-to-end relation so as to form a line of elements, said elements having substantially the same outside diameters, insulating means separating each pair of adjacent ones of said cylindrical elements, a hollow substantially cylindrical pick-up electrode having an inside diameter exceeding the outside diameter of said elements, said pick-up electrode being substantially concentric with and outside the tubular assembly formed by said line of cylindrical elements so as to be spaced therefrom and capacitively coupled thereto, means for producing relative movement between said pick-up electrode and said line of elements so as to vary the position of said pick-up electrode along the length of said line of elements, and means for applying electrical potentials mutually different with respect to a point of reference potential to successive elements, the arrangement being such that upon application of said potentials to said elements the potential of said pick-up electrode with respect to said point of reference potential is determined by the capacitive coupling between itself and the elements which are adjacent to the pick-up electrode, whereby movement of said pick-up electrode along said line of elements causes the electric potential of said pick-up electrode to interpolate between potentials corresponding to the successive ones of said elements to which said pick-up electrode becomes adjacent.

2. An electrical capacitive potentiometer comprising at least three separate and discrete hollow substantially cylindrical electrically conductive elements arranged in adjacent end-to-end relation so as to form a line of elements, said elements having substantially the same inside diameters, insulating means separating each pair of adjacent ones of said elements, a substantially cylindrical pick-up electrode having an outside diameter smaller than the inside diameter of said elements, said pick-up electrode being substantially concentric with and inside the tubular assembly formed by said line of cylindrical elements so as to be spaced therefrom and capacitively coupled thereto, means for producing relative movement between said pick-up electrode and said line of elements so as to vary the position of said pick-up electrode along the length of said line of elements, and means for applying electrical potentials mutually different with respect to a point of reference potential to successive ones of said elements, the arrangement being such that upon application of said potentials to said elements the electrical potential of said pick-up electrode with respect to said point of reference potential is determined by the capacitive coupling between itself and such of said elements as are adjacent to the pick-up electrode, whereby movement of said pick-up electrode along said line of elements causes the electrical potential of said pick-up electrode to interpolate between potentials corresponding to the successive ones of said elements to which said pick-up electrode becomes adjacent.

3. A potentiometer as claimed in claim 2, wherein said pick-up electrode is mounted in a recess in a housing which is movable along guide rods extending substantially parallel to said line of cylindrical elements, and wherein two capacitive guard rings are provided, one on each side of said pick-up electrode and insulated therefrom.

4. A potentiometer as claimed in claim 2, wherein said pick-up electrode is mounted on, and movable with, a shaft which passes down the center of the tubular assembly formed by said line of cylindrical elements, and wherein said shaft also carries guard rings, one on each side of, and insulated from said pick-up electrode.

5. Apparatus for positioning a movable member along a track, said apparatus comprising a series of at least three separate and discrete electrically conductive elements arranged in adjacent side-by-side relation so as to form a line of elements which simulates the track along which said member can move, a pick-up electrode associated with the elements of said series and spaced therefrom so as to be capacitively coupled thereto, means connecting said pick-up electrode to said movable member such that when the latter moves along said track said pick-up electrode makes a corresponding movement along said line of elements, and vice versa, means for applying electrical potentials mutually different with respect to a point of reference potential to successive ones of said electrically conductive elements, to cause said pick-up electrode to assume a potential with respect to said point of reference potential which is dependent on its position along said line of elements and hence on the position of said movable member along said track, a source for producing a potential having a value with respect to the potential of said point of reference potential corresponding to a desired position of said movable member, a potential comparator to which the potential from said pick-up electrode and the potential from said source are applicable, said comparator giving an output representative of the relation between the position of said movable element and of desired positions thereof, and means responsive to said output to move said movable member to said desired positions.

6. An electrical system responsive to the relative position of a first member with respect to a second member, said system comprising a capacitative potentiometer including a series of electrically discrete, adjacent elements disposed side by side to form a line of elements and a pickup electrode mounted for movement with respect to said elements, along the line of said elements while presenting an electrical capacitance with the elements of the series, means for mechanically coupling said first and second members to said series of elements and to said electrode respectively whereby relative movement of said electrode and the elements of the series is concomitant upon relative movement of said members, means for impressing upon said elements a high frequency alternating voltage thereby to establish a high frequency field along the line of said elements and to induce in said electrode a voltage that is a function of the relative position of said electrode and said elements, alternating current signal means responsive to an output signal voltage existing between said electrode and a point of reference potential, and actuating means responsive to said output signal.

7. An electrical system responsive to the relative position of a first member with respect to a second member, said system comprising a capacitative potentiometer including a series of at least three electrically discrete, adjacent elements disposed side by side to form a line of elements and a pickup electrode mounted for movement with respect to said elements, along the line of said elements while presenting an electrical capacitance with the elements of the series, means for mechanically coupling said first and second members to said series of elements and to said electrode respectively whereby relative movement of said electrode and the elements of the series is concomitant upon relative movement of said members, means for impressing upon each of said elements a high frequency alternating voltage thereby to establish a high frequency field along the line of said elements and to induce in said electrode a voltage that is an unambiguous function of the relative position of said electrode and said elements, alternating current signal means responsive to an output signal voltage existing between said electrode and a point of reference potential, and actuating means responsive to said output signal.

References Cited in the file of this patent

UNITED STATES PATENTS

| | | |
|---|---|---|
| 2,020,275 | Beers | Nov. 5, 1935 |
| 2,036,084 | Roder | Mar. 31, 1936 |
| 2,137,435 | Yolles | Nov. 22, 1938 |
| 2,789,259 | Eisler | Apr. 16, 1957 |